UNITED STATES PATENT OFFICE.

CHARLES EFROS, OF NEW YORK, N. Y., ASSIGNOR TO VINCENT P. TRAVERS, OF SAME PLACE.

COMPOSITION FOR TREATING FIBER.

SPECIFICATION forming part of Letters Patent No. 557,568, dated April 7, 1896.

Application filed April 8, 1895. Serial No. 545,002. (No specimens.)

*To all whom it may concern:*

Be it known that I, CHARLES EFROS, a subject of the Emperor of Russia, residing in the city, county, and State of New York, have invented certain new and useful Improvements in Treating Vegetable Fiber, of which the following is a specification.

My invention relates to treating vegetable fiber, more particularly the fiber used in the manufacture of ropes or cords and known as "hard" fiber, like hemp, linen, or jute, but is applicable, nevertheless, to all vegetable fibers.

My invention consists, mainly, in chemical mixtures for treating fiber—such, for instance, as the mixtures and solutions hereinafter specified—although other and analogous substances and mixtures may be used with like effect.

By my invention the fiber treated becomes more useful and valuable in consequence of its greatly-enhanced qualities, chief among which are its improved appearance and greater adaptability for spinning or otherwise working, due to its greatly-improved flexibility, elasticity, freedom from lumps or unevenness, higher degree of gloss, greater body, lighter color, and the general superiority of the manufactured product.

My composition is capable of great variation as to the substances employed for treating the fiber, their proportions, and the manner of applying them to the fiber.

In order that my invention may be fully understood, I will state in detail the ingredients of one composition employed by me, the manner of making it, and one mode of applying it to the fiber, it being of course understood that I do not mean to thereby limit myself to the precise ingredients, proportions, and manipulations described, but merely state this as a single definite process.

I proceed as follows: I take four hundred and eighty pounds silicate of magnesia, six hundred and forty pounds glucose, two hundred and eighty pounds wheat-flour, forty-eight pounds paraffin, thirty-six pounds alkali soap, twenty pounds neutral soap, eight pounds creosote, five pounds phosphate of soda, one thousand pounds refined paraffin-oil, twenty-five pounds tallow, and three hundred pounds water. As I have before stated, these ingredients and proportions may be greatly varied. For instance, the water and paraffin-oil may be used interchangeably as vehicles for the remainder of the ingredients, and either or both may be used.

The silicate of magnesia serves to impart softness, and, I may say, a lubricating effect to the fiber and may be replaced by analogous substances—such as steatite, silicate of aluminium, (china-clay,) silicate of potassium, silicate of soda, (water-glass,) or the carbonates of barium or magnesia, or the acetate or oxide of lead.

The glucose of the above-described mixture, being used to impart gloss to the fiber and also as a binding substance to hold the remaining ingredients properly together, may be replaced by its analogues—such as sugar, syrup, or molasses. Similarly the wheat-flour which in the above-described mixture is used as a binder and as a dressing may be replaced by any suitable form of starch or by albumen, casein, or dextrine.

The paraffin in the mixture, in addition to serving to soften and lubricate the fiber, also adds gloss to the fiber, and may be replaced by stearin, beeswax, mineral wax, vegetable wax, and the like.

The creosote of the mixture being used, a preservative of the fiber and of the composition, may be replaced by other analogous preservatives—such as carbolic acid, salicylic acid, strychnine, acetic acid, and the like.

The phosphate of soda in the mixture is used as a softener for the fiber, in that it combines with the cellulose of the fiber to render it sufficiently soft to permit of its being more easily stretched in spinning, makes an emulsion with the oil, and is a highly important ingredient of the mixture. The phosphate of soda may be replaced by an attenuated solution of caustic alkali or of a solution or a combination of alkali with a weak acid. The phosphate-of-soda solution may also be used alone, if desired, as a softening solution *per se*. I have found a solution of phosphate of soda to answer well for the purpose.

The paraffin-oil of the mixture may be replaced by any other light or heavy mineral oil or a mixture thereof with animal or vegetable oil, or if a yarn be required which shall have no oil in it one thousand pounds of water may be substituted for the paraffin-oil.

The water and oil of the mixture are mainly vehicles for carrying the other ingredients into the interstices of the fiber, and all or nearly all the water is evaporated out of the fiber; but the oil, evaporating more slowly than water, is in important cases much preferable to water, because it also serves as a lubricant.

The tallow of the mixture may be replaced by numerous fats and oils, principal among which are the following: fat of bones, bleached palm-oil, cocoanut-oil, castor-oil, olive-oil, and pork-fat. The tallow may also be replaced by glycerin.

A small proportion of colophony mixed with alkali, such as crystallized soda, may be added to my mixture when it is desired by the formation of a resin soap to add to the body of the fiber and to improve its appearance.

There yet remains to discuss the soaps in the mixture. These perform peculiar functions. The soap serves the purpose of cleaning the fiber and keeping it clean and, combining with the natural pitch on the fiber, makes of the pitch a sort of resin soap, thereby beautifying the appearance of the fiber and also softening it as more and more of the natural pitch is eliminated. All these various ingredients may be combined in various proportions, and one or more of them may be omitted, according to the properties desired in the treated fiber. No general rule can be laid down except this: that whatever qualities it is desired to have in the treated fiber the ingredient which is to produce these qualities is left in the mixture, and whatever qualities it is desired shall be absent from the treated fiber the ingredients which impart those qualities to the fiber are omitted from the mixture.

The ingredients employed may be mixed by various means; but I have found the following to be a good mode of procedure: In a vessel containing about three hundred pounds of water I first incorporate the wheat-flour by thorough stirring and allow it to stand about twenty-four hours, so that the gluten will be dissolved. Into a second vessel the paraffin-oil is poured, the contents stirred, the sulfate of baryta added and thoroughly stirred in, the silicate of magnesia then added and thoroughly stirred in, and the fermented flour mixture, which has been standing twenty-four hours, added, and the whole thoroughly united with the glucose during continuous agitation of the stirring apparatus. In a third vessel part of the paraffin-oil is introduced, together with the paraffin, the tallow, the alkali soap and the neutral soap, the creosote and the phosphate of soda. After these ingredients have been thoroughly mixed together in the presence of heat, the contents of the second vessel above mentioned are added and the whole stirred together, preferably with the aid of compressed air, which is forced in so as to assist in agitating, the contents of said vessel being meanwhile brought to a temperature of about 60° Réaumur. Finally the contents are poured through a sieve. The liquid thus produced can be utilized to produce the aforementioned effects upon fiber before spinning and may be applied in various ways. One method of application is to spray the liquid heated to a temperature of about 60° Réaumur upon the fiber, which has previously been spread out, and which, while being sprayed under pressure, is maintained at the same temperature as the spraying liquid—that is to say, about 60° Réaumur. The heat has the effect of opening the pores and interstices in the fiber, and the liquid permeates the body of the fiber and thoroughly impregnates it.

Now, while I have specifically set forth certain ingredients as composing my mixture, I desire to have it understood that there are numerous equivalents which may be used in lieu of the several ingredients, and I have specifically set forth some of these equivalents; so, therefore, when I mention a component of the mixture specifically I wish to have it understood that in so doing I mean to include not only the component thus specified, but equivalent substances. For instance, when I refer in the claims of invention to "phosphate of soda" I wish to be understood as including all equivalents for phosphate of soda which in this mixture, as I have before stated, are in general solutions of caustic alkali. It is with this explanation that I desire the claims to be interpreted.

Having described my invention and one method of carrying out the same, what I claim, and desire to secure by Letters Patent, is—

1. A mixture for treating fiber composed of the following ingredients in about the proportions specified: silicate of magnesia, glucose wheat-flour, paraffin, soap, creosote, phosphate of soda and tallow, with a suitable vehicle, as specified.

2. A mixture for treating fiber composed of the following ingredients in about the proportions specified: silicate of magnesia, glucose, wheat-flour, paraffin, soap, phosphate of soda, tallow and a vehicle, as specified.

3. A mixture for treating fiber composed of the following ingredients in about the proportions specified: silicate of magnesia, glucose, wheat-flour, paraffin, soap, creosote, phosphate of soda, tallow and paraffin-oil, as specified.

CHARLES EFROS.

Witnesses:
GEORGE E. MORSE,
HARRY M. TURK.